United States Patent
Zheng

(10) Patent No.: US 6,453,074 B1
(45) Date of Patent: *Sep. 17, 2002

(54) SYSTEM FOR IMAGE DECIMATION INCLUDING SELECTIVE FILTERING

(75) Inventor: Joe Zheng, Saratoga, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,494

(22) Filed: Mar. 31, 1997

(51) Int. Cl.[7] ................................................ G06K 9/40
(52) U.S. Cl. .................... 382/260; 382/162; 382/299
(58) Field of Search ............................. 382/260–264, 382/239, 240, 298–299, 275, 268, 166, 167, 254, 161–164; 358/530, 518, 445, 1.9, 1.2; 348/392, 392.1, 668, 622–624; 345/430–431, 660, 597–598, 587, 589, 591; 375/240.05, 240.23, 240.21

(56) References Cited

U.S. PATENT DOCUMENTS

| | | | | |
|---|---|---|---|---|
| 4,561,022 A | * | 12/1985 | Bayer | 348/622 |
| 4,691,233 A | | 9/1987 | Acampora | 375/240.05 |
| 4,868,653 A | * | 9/1989 | Golin et al. | 375/240.23 |
| 4,918,523 A | * | 4/1990 | Simon et al. | 375/540.23 |
| 4,974,065 A | * | 11/1990 | Murakami et al. | 348/668 |
| 5,047,838 A | * | 9/1991 | Murakami et al. | 348/392.1 |
| 5,384,869 A | | 1/1995 | Wilkinson | 382/240 |
| 5,450,216 A | * | 9/1995 | Kasson | 358/518 |
| 5,566,284 A | | 10/1996 | Wakayama | 345/587 |
| 5,778,104 A | * | 7/1998 | Kowaski | 382/261 |
| 5,845,017 A | * | 12/1998 | Keyes | 382/261 |
| 5,933,542 A | * | 8/1999 | Chang et al. | 382/264 |

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

Image decimation of a high resolution input image so as to obtain a decimated low resolution image. Image decimation includes adaptive pre-filtering in which a pixel-by-pixel determination is made of busyness in the neighborhood of a target pixel, and based on the determination of busyness a low-pass filter is selectively and adaptively applied prior to sub-sampling to obtain the decimated image.

60 Claims, 9 Drawing Sheets

| 1/16 | 1/8 | 1/16 |
|---|---|---|
| 1/8 | 1/4 | 1/8 |
| 1/16 | 1/8 | 1/16 |

| 0 | 1/48 | 1/32 | 1/48 | 0 |
|---|---|---|---|---|
| 1/48 | 1/16 | 1/12 | 1/16 | 1/48 |
| 1/32 | 1/12 | 1/8 | 1/12 | 1/32 |
| 1/48 | 1/16 | 1/12 | 1/16 | 1/48 |
| 0 | 1/48 | 1/32 | 1/48 | 0 |

FIG. 9

SYSTEM FOR IMAGE DECIMATION INCLUDING SELECTIVE FILTERING

BACKGROUND OF THE INVENTION

1. Field of the Invention

The present invention relates to computerized image and color image processing, and more particularly to image decimation with adaptive pre-filtering whereby a pixel-by-pixel determination is made of image busyness based on which it is decided whether to pre-filter before decimation.

2. Description of the Related Art

As resolution of computerized images and color images increases, the amount of storage needed to store such images has increased dramatically. For example, for computerized images at 400 dots per inch (dpi) resolution, each square inch of image area is formed by a 400×400 pixel matrix. Consequently, for a standard 8½×11 inch page, information for 14,960,000 pixels is needed. For a full color image formed by three color components (such as red, green and blue (RGB) color components), at eight bits per color component, 45 megabytes of memory are needed.

Processing 45 megabytes of information strains even the most advanced personal computing equipment available today. For example, simply to display 45 megabytes of a color image strains the bandwidth available on a typical computer bus. Accordingly, a long time is needed simply to display the image.

Furthermore, once the image is displayed, it is commonplace to manipulate the image such as by adjusting color and contrast, or by applying various image processing operations such as sharpness enhancements, posterization, special effects, and the like. Such image manipulations require a long time when applied to a full 45 megabyte image. Moreover, it is commonplace for such manipulations to be arrived at through a process of trial and error by which various image processing operations are tried until a pleasing effect is arrived at. When these-trial and error processes are applied to a full 45 megabyte image, the computational power of even advanced personal computing equipment severely limits the speed at which a pleasing effect can be determined.

In consideration of the foregoing, it has been proposed to decimate the high resolution image prior to display and manipulation, and to use the decimated image as a proxy both for display and manipulation. A decimated image is a low resolution image derived from an original high resolution image, and is typically derived by sub-sampling the image, such as by selecting every other pixel in both horizontal and vertical directions. Once a decimated image has been derived, it is the decimated image that is displayed, and it is the decimated image upon which the trial-and-error process of determining pleasing image manipulations is effected. Once a pleasing effect has been determined, it is applied to the high resolution image. Thus, the decimated image serves as a proxy for the high resolution image, permitting rapid display and speedier derivation of pleasing visual effects.

Derivation of a decimated image proceeds in two steps: a first step in which the high resolution image is subjected to low-pass filtering, and a second step in which the filtered image is sub-sampled. Low-pass filtering is applied so as to avoid the introduction of artifacts in the decimated image by eliminating high frequency components that might cause signal aliasing during sub-sampling. While such low-pass filtering is necessary at high frequency areas of the high resolution image, unwanted side effects are often introduced. For example, low-pass filtering causes blurring of the image, and can introduce a color shift when the frequency content of one color component differs significantly from the other two.

Thus, while low-pass filtering prior to sub-sampling is needed to prevent signal aliasing caused by sub-sampling, such low-pass filtering introduces unwanted side effects that have not heretofore been adequately addressed in the art.

SUMMARY OF THE INVENTION

It is an object of the present invention to address the disadvantages found in conventional image decimation processes which involve low-pass filtering followed by sub-sampling, and to address these disadvantages through adaptive pre-filtering in which the application of a low-pass filter to a target pixel depends on the local busyness of the image.

Thus, in one aspect, the invention is image decimation in which a pixel-by-pixel determination is made of busyness in the image, based on which it is decided whether or not to low-pass filter before sub-sampling. As used herein, "busyness" refers to the spatial frequency content of a neighborhood of pixels surrounding a target pixel. The spatial frequency content can be determined by standard transformation techniques such as Fourier or Hough transformation, or it may be made through a simple comparison of intensity values of the target pixel to those of adjacent surrounding pixels. Based on the determination of busyness, the characteristics of low-pass filtering that is applied to the target pixel are determined. For example, based on the determination of busyness, it might be decided not to apply any low-pass filtering for a pixel with low busyness, whereas low-pass filtering would be applied to a pixel that does not have low local busyness. As another example, different degrees of low-pass filtering might be applied based on the amount of local busyness.

For black-and-white or grayscale images in which there is only one color component (or in which all three of the RGB color components are equal), busyness can be determined based on only a single color component and adaptiv[0085] filtering applied to the same color component. For color images, on the other hand, it is preferable to transform the color image into a color space that closely matches human visual perception if the color image is not already in such a color space. For example, for an RGB color image, it is preferable to transform the image into CIEL*a*b* color space prior to a determination of busyness. Thereafter, the determination of busyness is made based only on the L* component. Equal adaptive pre-filtering may thereafter be applied to all three color components in the event that local busyness of the L* component indicates that such pre-filtering is desirable, but it is more preferable to pre-filter only the L* component since the a* and b* components are responsible primarily only for chromaticity. Thereafter, the adaptively pre-filtered L*a*b* is transformed back into RGB color space, for sub-sampling to form the decimated image.

Good results of color images are also obtained without transforming to different color spaces. In this case, it is possible to treat each color component independently, with each color component being adaptively pre-filtered and sub-sampled independently of the other two color components. Likewise, it is also possible to select one color component such as green (which is known to closely follow the brightness component in YIQ color space) as the color component for which a busyness determination is made, with all three color components being adaptively pre-filtered based on the determination of busyness for the selected single color component.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 5 is a view for explaining how to determine busyness for a target pixel.

FIGS. 6 and 9 are representational views of masks for a low-pass filter.

DETAILED DESCRIPTION OF THE PREFERRED EMBODIMENT

Figure 1:
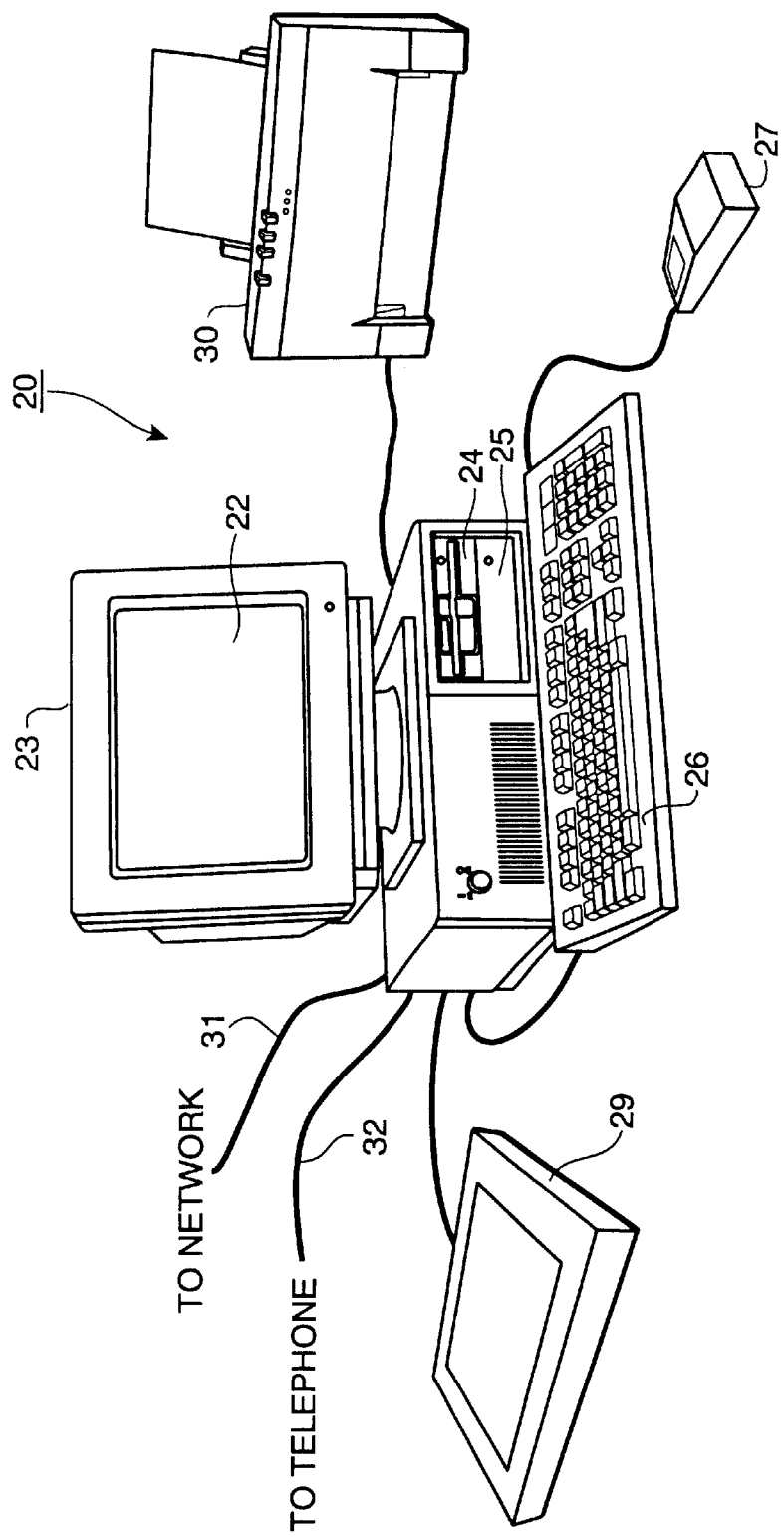
FIG. 1 is a view showing the outward appearance of representative computing equipment which incorporates image decimation with adaptive pre-filtering according to the invention.

FIG. 1 is a view showing the outward appearance of representative computing equipment which incorporates image decimation according to the invention. Shown in FIG. 1 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects and images displayed on display screen 22, and a pointing device 27 such as a mouse or the like which is also provided to permit manipulation of objects and images on display screen 22. A conventional scanner 29 is provided for scanning original documents such as color image documents so as to input high resolution color image data. A conventional color printer 30, such as a color bubble jet printer, is provided for outputting color images. Also provided are connections to a network 31 or to an ordinary voice telephone line 32, both for sending and receiving color image data as wall as other files such as files which include program instruction sequences by which computing equipment 20 is operated.

In accordance with operator instructions, and under control of the windowing operating system, stored application programs such as graphics application programs, drawing application programs, desktop publishing application programs and the like, are selectively activated to process and to manipulate data and image data. Also in accordance with operator instructions, and based on those stored application programs, commands are issued to scan in images on scanner 29, to display images on monitor 23, and to print images appearing on monitor 23.

Figure 2:
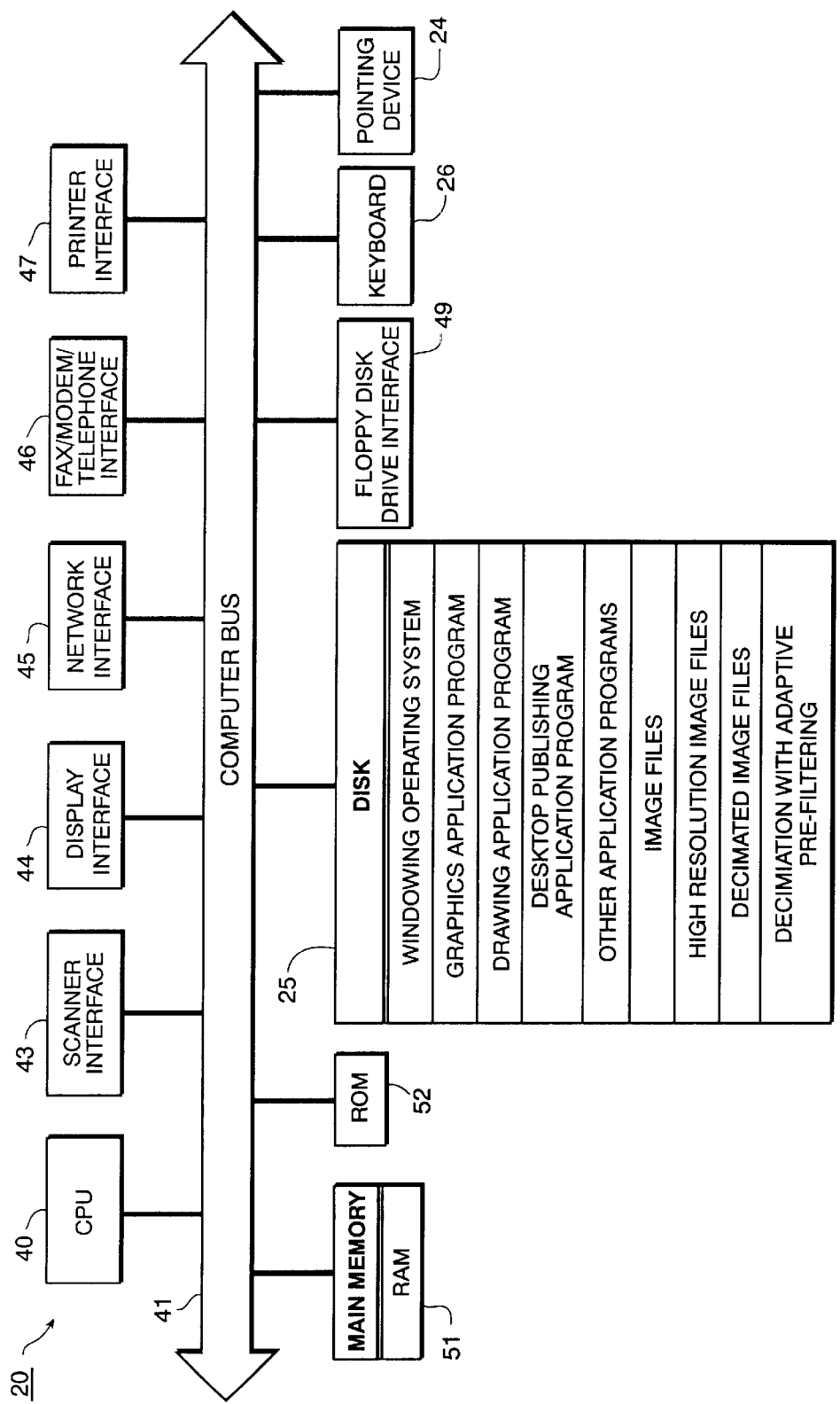
FIG. 2 is a detailed block diagram showing the internal construction of FIG. 1.

FIG. 2 is a detailed block diagram showing the internal construction of computing equipment 20. As shown in FIG. 2, computing equipment 20 includes a central processing unit (CPU) 40 such as programmable microprocessor interfaced to a computer bus 41. Also interfaced to computer bus 41 is scanner interface 43, display interface 44, network interface 45 for interfacing to network 31, fax/modem/telephone interface 46 for interfacing to telephone 32, printer interface 47, and floppy disk drive interface 49.

Main memory 51 such as random access memory (RAN) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51. Main memory 51 may also include a page buffer for storing image data.

ROM (read only memory) 52 is provided for storing invariant instruction sequences such as start-up instruction sequences or basic input/output operating system (BIOS) sequences for operation of keyboard 26.

As shown in FIG. 2, and as previously mentioned, fixed disk 25 stores program instruction sequences for the windowing operating system and for various application programs such as a graphics application program, a drawing application program, a desktop publishing application program, and the like. In addition, also stored on fixed disk 25 are image files such as high resolution image files and decimated image files, as well as code for process steps to perform decimation with adaptive pre-filtering according to the invention. In this embodiment, decimation with adaptive pre-filtering is shown as a stand-alone utility by which high resolution images may be decimated to obtain proxy images for use in graphic and drawing application programs. More preferable, however, is an arrangement by which the code for decimation with adaptive pre-filtering is incorporated as an option directly into the graphics application programs and the drawing application programs.

Ordinarily, application programs stored on disk 25 need first to be installed by the user onto disk 25 from other computer readable media on which those programs are initially stored. For example, it is customary for a user to purchase a floppy disk or other computer readable media on which a copy of an application program containing decimation according to the invention is stored. The user would then install decimation onto disk 25 by inserting the purchased floppy disk into floppy disk drive 24 and by commanding CPU 40 to copy from the floppy disk onto disk 25. It is also possible for the user, via telephone 32 and modem interface 46, or via network 31 and network interface 45, to download from a computerized bulletin board to which decimation according to the invention had previously been uploaded.

Figure 3:
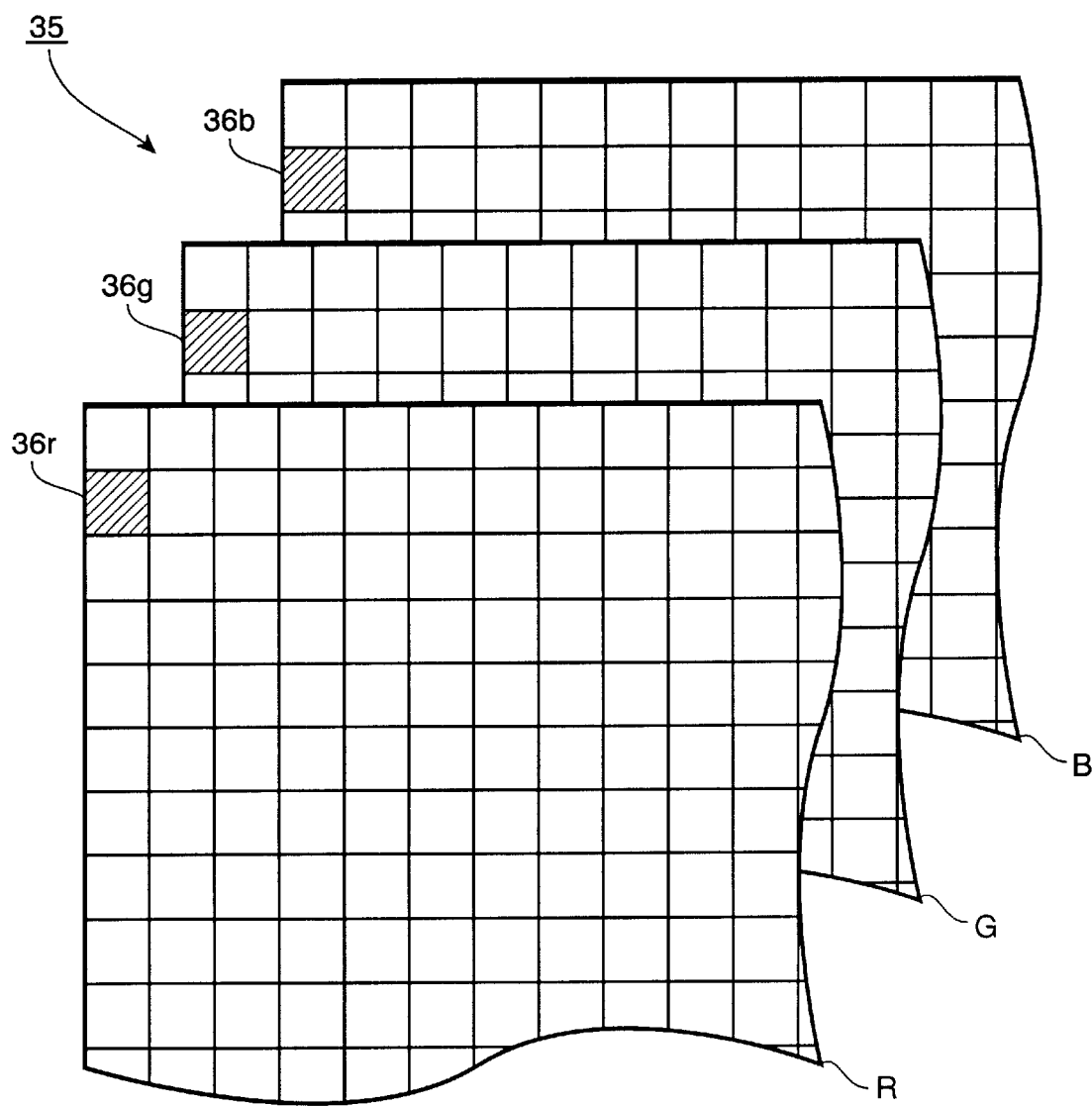
FIG. 3 is a representational view of RGB color components that form a bit map color image.

FIG. 3 is a representational view of bit map image 35 forming a color image. As seen in FIG. 3, bit map image data 35 is comprised by image data for three color planes, a red color plane, a green color plane, and a blue color plane. Each pixel of the color image has corresponding pixel data 36 in each color plane. For each of the RGB color planes, pixels 36 are arranged in a two-dimensional array of pixels so as to form bit map image data, whose resolution is determined in accordance with the number of pixels per image inch. Each of the pixel data 36 is stored in an eight bit byte on a memory such as on disk 25 or in RAM 51. Thus, the color of each pixel in the color image is represented by 24 bits of pixel data, and is commonly referred to as 24-bit or 16-million color data.

Figure 4:
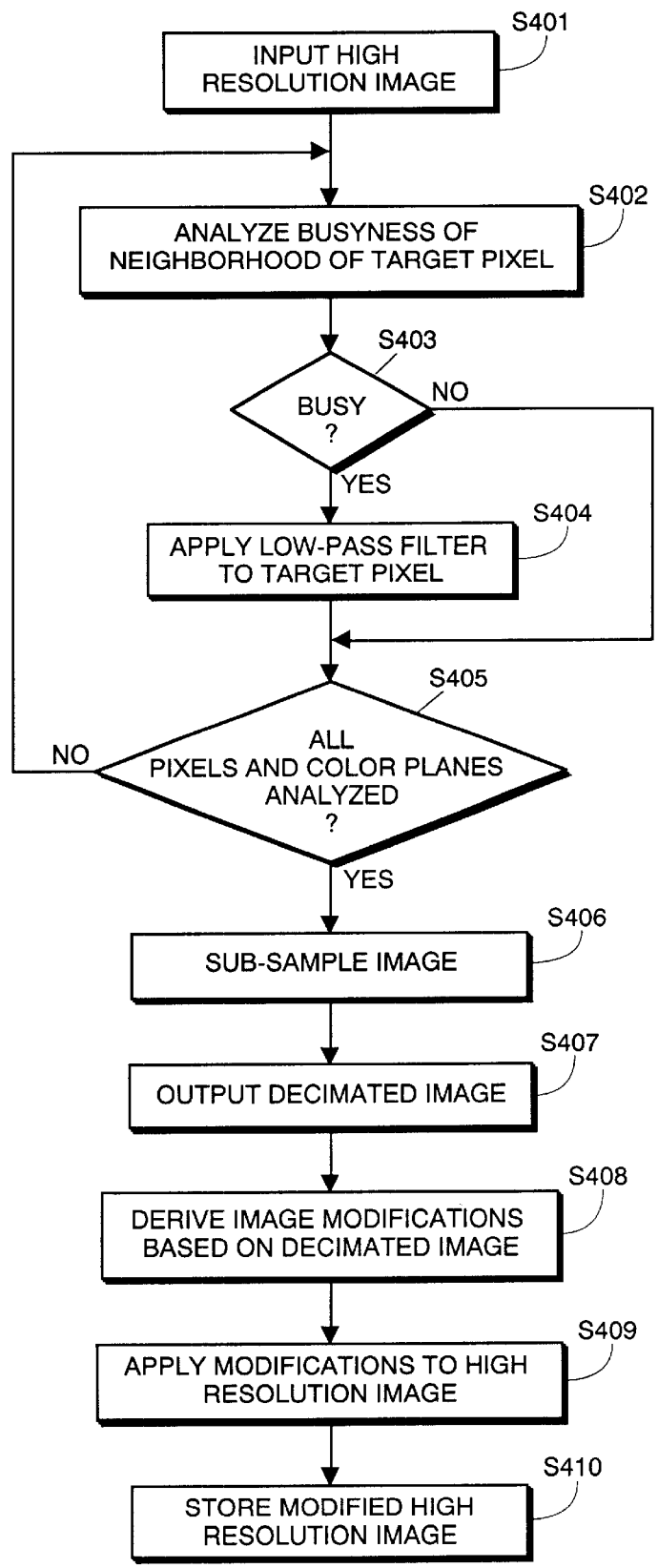
FIG. 4 is a flow diagram showing process steps for image decimation according to one embodiment of the invention.

FIG. 4 is a flow diagram showing process steps for decimation according to one embodiment of the invention. The process steps depicted in FIG. 4 are stored as computer code on disk 25, or in main memory 51, and executed by CPU 40. Generally speaking, the process steps depicted in FIG. 4 decimate a high resolution image by performing a pixel-by-pixel determination of busyness based on which it is decided whether to apply low-pass filtering before sub-sampling so as to form a decimated image.

In more detail, step S401 obtains a high resolution image such as from scanner 29, disk 25 or over the network. Steps S402 through S405 process each pixel of the high resolution image in turn, so as to determine busyness of the neighborhood for each pixel and so as to decide whether to apply low-pass filtering to each such pixel. Preferably, steps S402 to S405 are applied independently for each of the R, G and B color planes and independently for each such pixel in such color planes. Thus, it is possible that pixel 36r (see FIG. 3) will have low-pass:filtering applied thereto because its neighborhood exhibits high busyness, whereas pixels 36g and 36b will not have low-pass filtering applied because neighborhoods of those pixels have low busyness.

Figures 5, 6:
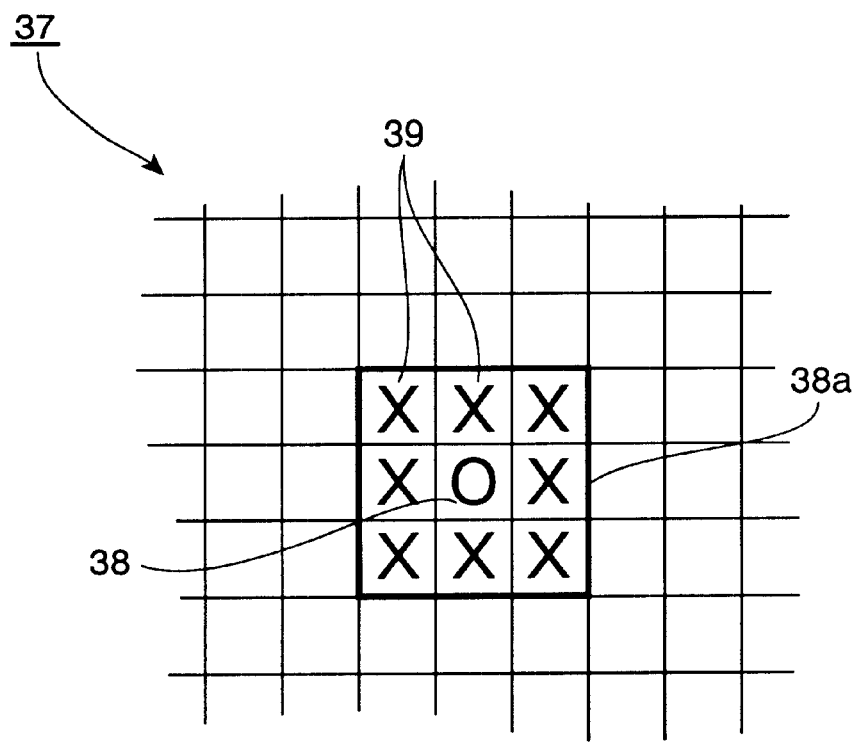

In more detail, step S402 analyzes busyness of a neighborhood of the target pixel such as by determining the spatial frequency content of a neighborhood of the target pixel or by calculating intensity changes or dissimilarities of the target pixel to surrounding pixels. FIG. 5 illustrates this process with respect to a representative portion 37 of one of the R ,G and B color planes illustrated in FIG. 3. FIG. 5 illustrates a determination of busyness for neighborhood 38a of target pixel 38. To determine busyness of the neighborhood, the absolute difference is calculated between the intensity value of pixel 38a and each of the adjacent pixels 39. Since there are eight adjacent pixels 39, eight absolute differences are calculated. These absolute differences are then summed, and the summation represents the busyness of neighborhood 38a.

Step S403 determines whether or not the neighborhood is busy. In this embodiment, the determination is made by comparing the summation of the absolute differences to a threshold such as 30. If the summation exceeds the threshold, then it is determined that the neighborhood is busy; otherwise, it is determined that the neighborhood is not busy.

If it is determined in step S403 that the neighborhood of the target pixel is busy, then a low-pass filter is applied to the target pixel in step S404. Preferably, low-pass filtering of a target pixel is calculated based on pixel values of all pixels in the neighborhood, and preferably the low-pass filter is as close as possible to an idealized filter having a gain of 1 for all spatial frequencies below the band pass and a gain of 0 for all frequencies above the band pass. In the present embodiment, a low-pass filter is realized by applying a weighted mask to all pixels in the neighborhood of the target pixel, with the weights being selected based on a Gaussian distribution and with the weights summing to 1. FIG. 6 shows weights for a suitable mask, which is applied to a 3×3 pixel neighborhood surrounding the target pixel.

On the other hand, should step S403 determine that the neighborhood of the target pixel is not busy, then flow advances directly to step S405 which determines whether all pixels in all color planes have been analyzed. Flow returns to step S402 until all pixels in all color planes have been analyzed for busyness, and low-pass filtering selectively applied based on the determination of busyness.

Although in this embodiment of the invention analysis of busyness proceeds by a comparison of intensity changes in the neighborhood of a target pixel, other techniques for analyzing busyness may also be used. For example, it is possible to transform the neighborhood of a target pixel into spatial frequency components, such as by Fourier transform or by Hough transform. A spectral analysis may then be performed, to determine whether high frequency components exist in the neighborhood of the target pixel. Busyness would then be determined in the event that there are significate frequency components higher than the decimation frequency.

Furthermore, although it is preferred to base the analysis of busyness on the complete neighborhood of a target pixel, which in this first embodiment is a 3×3 grid surrounding the target pixel, this should not be viewed as limiting. Rather, a determination of busyness for the neighborhood of the target pixel can be made based on only some of the pixels adjacent the target pixel, so long as the determination of busyness is representative of the neighborhood of the target pixel.

Figure 10:
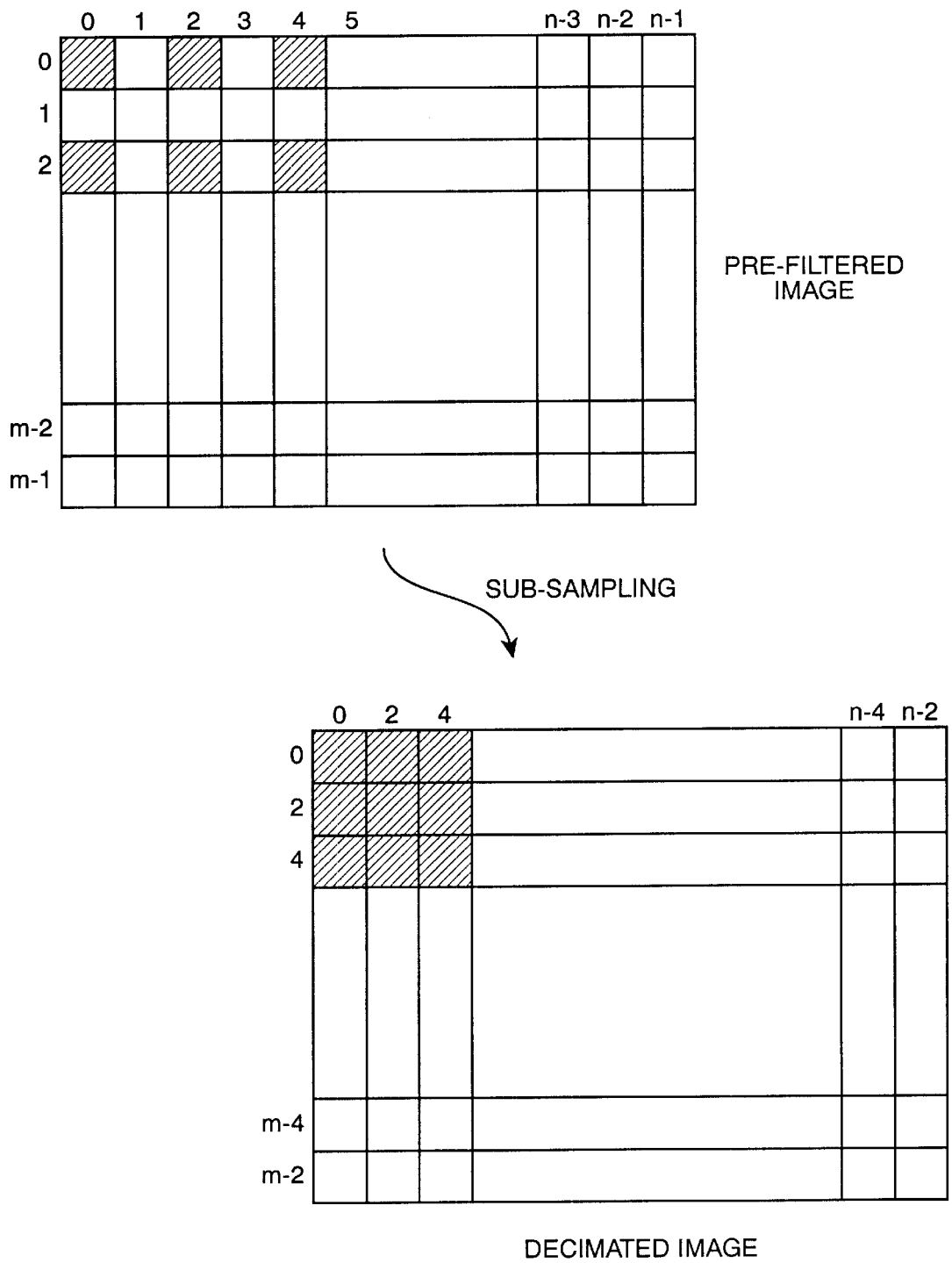
FIG. 10 is a view for explaining sub-sampling.

When all pixels and all color planes have been analyzed for busyness and adaptively pre-filtered, flow advances to step S406 which decimates the adaptively-filtered image. Decimation in step S406 proceeds by sub-sampling the image by a factor of 2 in which every other row and column of the image is discarded. This sub-sampling process is depicted in FIG. 10, in which an M-row by N-column pre-filtered image is sub-sampled by a factor of 2 to obtain a decimated image with M/2 rows and N/2 columns.

The decimated image is thereafter output in step S407 such as by printing to printer 30 or by displaying on display 23. Modifications to the image are thereafter derived in step S408, with the modifications being derived based on a trial and error procedure on the decimated image. Once a suitable modification has been obtained, the modification is applied to the original high resolution image (step S409), and the modified high resolution image is then stored (step S410).

Although in step S402 each pixel in each color plane is analyzed independently, it is also possible analyze busyness based only on one color plane, and then to apply selective low-pass filtering to all color planes based on the analysis of busyness in only the one selected color plane. For example, it is known that the green color component closely mimics the brightness color component in YIQ color space. Since human visual perception is most sensitive to brightness variations (as opposed to color variations), it is possible to select only the green color plane for analysis of busyness. Then, based on whether a neighborhood of target pixels in the green color plane is busy, low-pass filtering is applied not only to the target pixel in the green color plane, but also to corresponding pixels in the red and blue color planes.

Furthermore, although the foregoing has been explained as if the entire image is analyzed for busyness before any sub-sampling is performed, this is not necessarily required. Specifically, it is possible to analyze the neighborhood of a particular target pixel for busyness, and then proceed directly to sub-sampling for that target pixel, before any other neighborhoods are analyzed for busyness. In particular, since the sub-sampling process of step S406 results in retention of only one out of every four pixels, then only pixels that are to be retained need be analyzed for busyness and selectively pre-filtered. No analysis or determination needs to be performed on the remaining three out of four pixels. Thus, with reference to FIG. 10, busyness and adaptive pre-filtering would be applied to pixels shown With cross-hatching, whereas no processing would be performed for the non-cross-hatched pixels.

Figure 7:
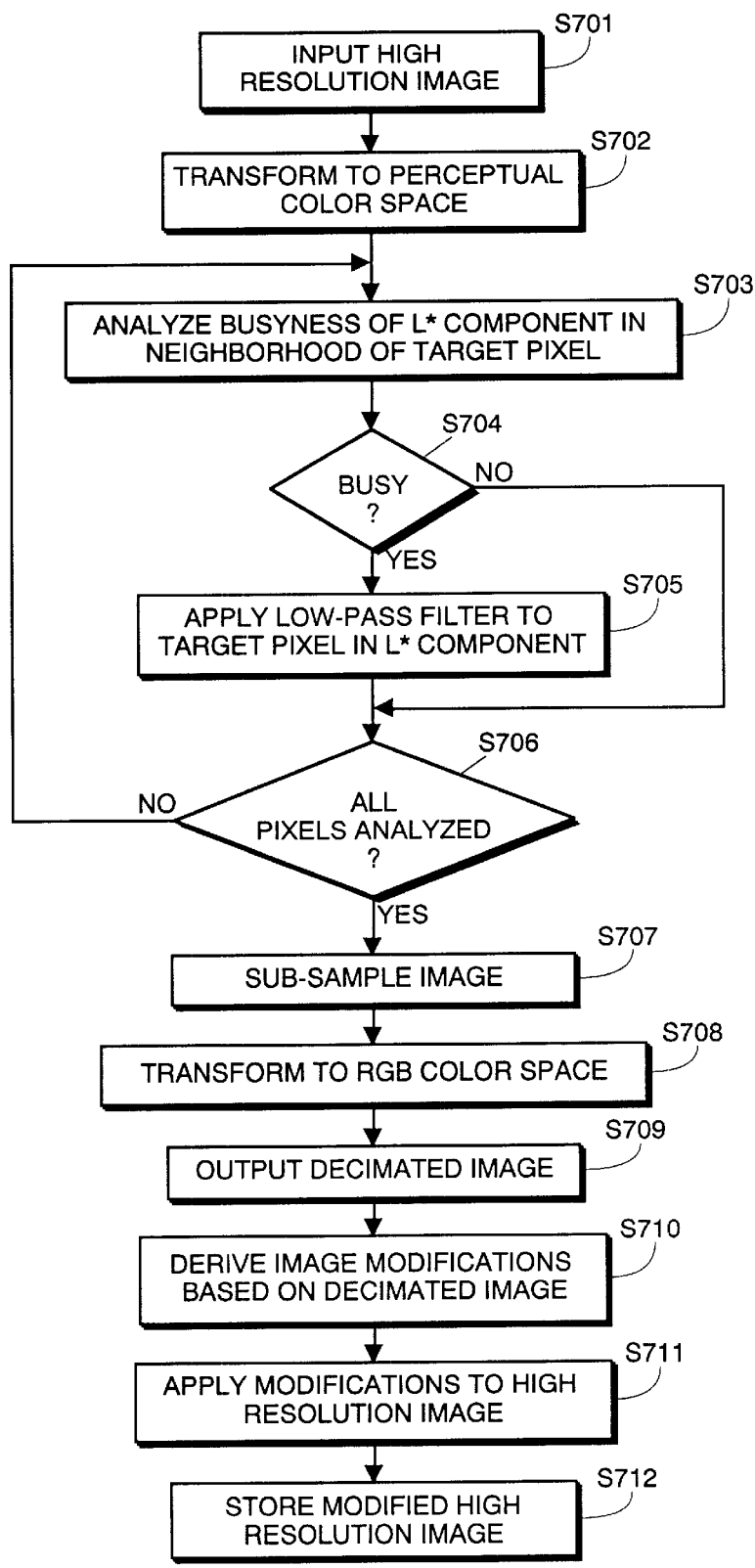
FIGS. 7 and 8 are flow diagram showing process steps for image decimation according to additional embodiments of the invention.

FIG. 7 is a flow diagram showing a second embodiment of the invention, in which color image data is transformed into a perceptually-based color space prior to a determination of busyness, if the image is not already in such a color space. Thus, one way that the second embodiment differs from the first embodiment is that color image data in RGB color space is transformed to L*a*b* color space prior to determination of busyness.

The process steps depicted in FIG. 7 are stored as computer code on disk 25, or in main memory 51, and executed by CPU 40. Generally speaking, the process steps depicted in FIG. 7 transform a high resolution image into a perceptually-based color space, determine busyness at each target pixel based on busyness of the neighborhood of the target pixel for the brightness component of the perceptual color space, and adaptively apply pre-filtering to the brightness component prior to sub-sampling based on the determination of busyness for the neighborhood of the target pixel in the brightness component.

In more detail, step S701 inputs a high resolution image in RGB color space, and step S702 transforms the RGB image into L*a*b* color space. Step S703 analyzes busyness of the L* component in the neighborhood of a target pixel. As in the first embodiment, the analysis of busyness can be accomplished by a comparison of intensity values, or by a spectral analysis of spatial frequency components in the neighborhood of the target pixel, or by other appropriate means for analyzing busyness. If step S704 determines that the neighborhood of a target pixel is busy, then flow advances to step S705 which applies a low-pass filter to the L* component. Good results may also be obtained by applying low-pass filtering to corresponding pixels for each of the L*, a* and b* components, but it is presently preferred to filter only the L* component since the a* and b* components are responsible primarily only for chromaticity and not brightness. Flow then-advances to step S706 which repeats steps S703 through S705 until all pixels in the L*component have been analyzed for busyness.

Flow then advances to step S707 in which the adaptively pre-filtered image is decimated by sub-sampling. Step S708 transforms the decimated image back to RGB color space. Thereafter, the decimated image is output (step S709), modifications to the original image are derived based on trial and error on the decimated image (step S710), the modifications so derived are applied to the sigh resolution image (step S711), and the modified high resolution image is stored (step S712).

Figure 8:
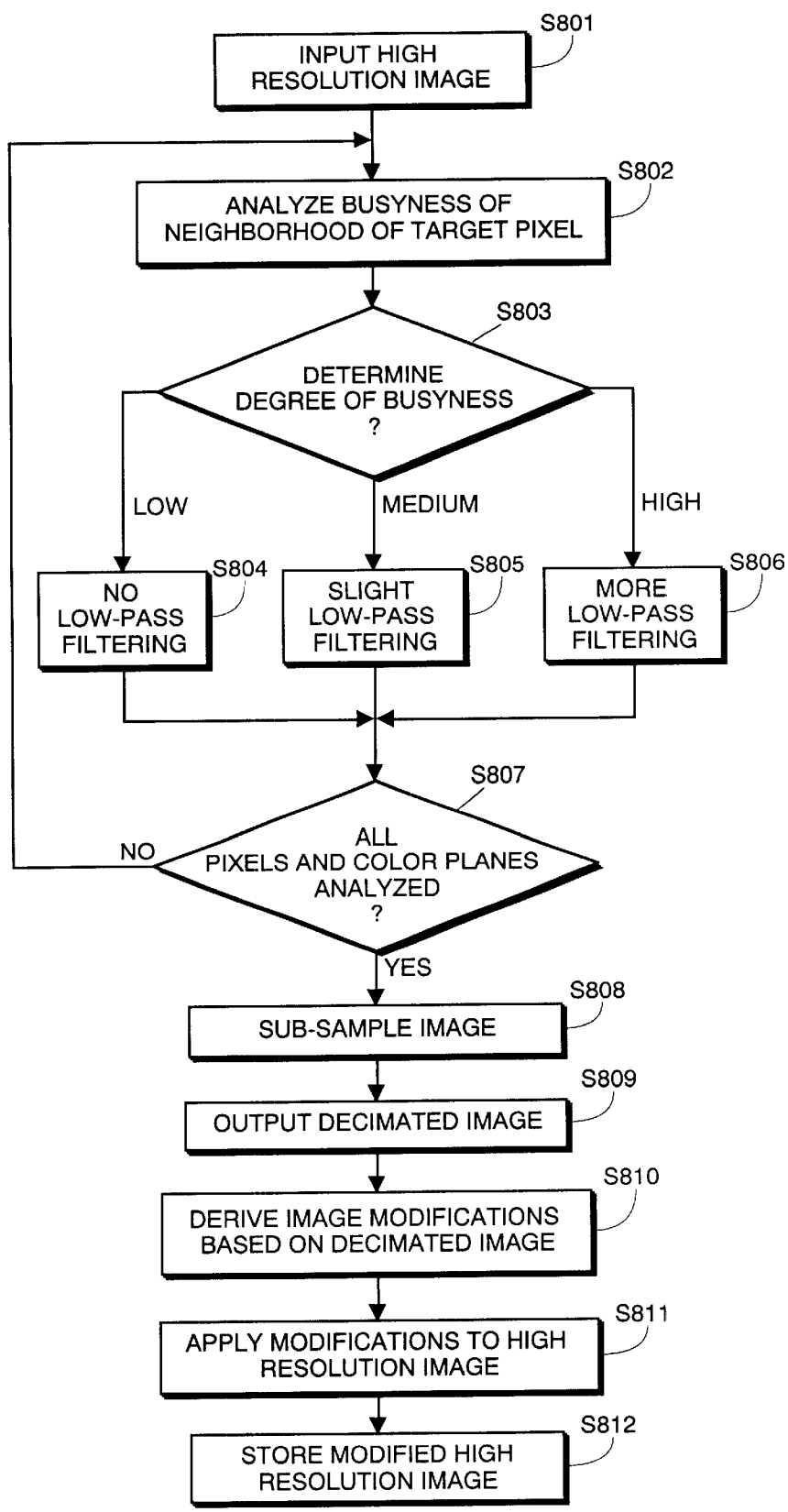

FIG. 8 is a flow diagram showing process steps for decimation with adaptive pre-filtering according to a third embodiment of the invention. The process steps depicted in FIG. 8 are stored as computer code on disk 25, or in main memory 51, and executed by CPU 40. One way that this third embodiment differs from the first embodiment is that the characteristics of low-pass filtering are varied based on the determination of busyness for the neighborhood of a target pixel. Thus, whereas the first embodiment decides whether to apply, or not to apply, a low-pass filter depending on busyness, this third embodiment applies low-pass filtering with differing characteristics based on the determination of busyness.

In more detail, a high resolution image is input, and in step S802 the busyness of a neighborhood of a target pixel is analyzed. Step SB03 determines the degree of busyness. If busyness is low, then flow advances to step S804 in which no filtering is applied. If step S803 determines that a moderate amount of busyness, then flow advances to step S805 in which a slight degree of low-pass filtering, such as that afforded by the weighted mask depicted in FIG. 6 is applied. On the other hand, if there is a high degree of busyness, then flow advances to step S806 in which a low-pass filter with significant filtering ability is applied. Again, a low-pass filter implemented with a weighted mask is preferred, such as the weights depicted in FIG. 9 which show a 5×5 pixel grid that is applied to the 5×5 pixel neighborhood of the target pixel.

Flow thereafter advances to step S807 which determines whether all pixels and all color planes have been analyzed for busyness and appropriate pre-filtering applied. When all pixels and all planes have been so-analyzed, flow advances to step S808 which decimates the pre-filtered image by sub-sampling. The decimated image is output (step S809), modifications based on the decimated image are then derived based on a trial-and-error procedure (step S810), the modifications 80 derived are applied to the high resolution image (step S811), and the modified high resolution image is stored (step S812).

It is emphasized that several changes and modifications may be applied to the above-described embodiments, without departing from the teaching of the invention. It is intended that all matter contained in the present disclosure, or shown in the accompanying drawings, shall be interpreted as illustrative rather than limiting. In particular, it is to be understood that any combination of the foregoing three embodiments may be utilized, so that the specifics of any one embodiment may be combined with any of the other or several other embodiments.

What is claimed is:

1. A method of decimating image data comprised of a plurality of planes of pixel image data, each of the plurality of planes representing a different component of pixel image data for a plurality of pixels, comprising the steps of:

determining busyness of a neighborhood for each pixel image data in one of the plurality of planes of image data;

selectively applying a low-pass filter to each pixel image data in the plurality of planes of pixel image data based on the determination of busyness for each pixel image data in the one of the plurality of planes; and sub-sampling the selectively filtered pixel image data in the plurality of planes.

2. A method according to claim 1, wherein the image data is color image data comprised of multiple color planes, and wherein said step of determining busyness is conducted for only one color plane, and wherein said step of selectively applying a low-pass filter is executed for all pixels in all color planes based on the determination of busyness in one color plane.

3. A method according to claim 1, further comprising the step of transforming the image data into a perceptual color space.

4. A method according to claim 1, wherein said step of determining busyness determines busyness based on a brightness color plane, and wherein said step of selectively applying a low-pass filter is executed for pixels in all color planes based on the determination of busyness in the brightness color plane.

5. A method according to claim 1, wherein said step of selectively applying a low-pass filter further comprises the step of selecting low-pass filter characteristics based on a degree of busyness determined in said determining step.

6. A method according to claim 1, wherein said step of determining busyness comprises the step of comparing intensity values for a target pixel with intensity values for adjacent pixels in the neighborhood.

7. A method according to claim 1, wherein said step of determining busyness comprises the step of determining spatial frequency content in the neighborhood.

8. A method according to claim 1 further comprising the steps of deriving modifications based on the decimated image and applying the derived modifications to the image data.

9. An apparatus for decimating image data comprised of a plurality of planes of pixel image data, each of the plurality of planes representing a different component of pixel image data for a plurality of pixels, the apparatus comprising:
   determining means for determining busyness of a neighborhood for each pixel image data in one of the plurality of planes of image data;
   applying means for selectively applying a low-pass filter to each pixel image data in the plurality of planes of pixel image data based on the determination of busyness for each pixel image data in the one of the plurality of planes; and
   sub-sampling means for sub-sampling the selectively filtered pixel image data in the plurality of planes.

10. An apparatus according to claim 9, wherein the image data is color image data comprised of multiple color planes, and wherein said determining means determines busyness for only one color plane, and wherein said applying means selectively applies a low-pass filter for all pixels in all color planes based on the determination of busyness in one color plane.

11. An apparatus according to claim 9, further comprising the transforming means for transforming the image data into a perceptual color space.

12. An apparatus according to claim 11, wherein said determining means determines busyness based on a brightness color plane, and wherein said applying means selectively applies a low-pass filter for pixels in all color planes based on the determination of busyness in the brightness color plane.

13. An apparatus according to claim 9, wherein applying further comprises selecting means for selecting low-pass filter characteristics based on a degree of busyness determined by said determining means.

14. An apparatus according to claim 9, wherein said determining means comprises comparing means for comparing intensity values for a target pixel with intensity values for adjacent pixels in the neighborhood.

15. An apparatus according to claim 9, wherein said determining means comprises determining means for determining spatial frequency content in the neighborhood.

16. An apparatus according to claim 9, further comprising deriving means for deriving modifications based on the decimated image and applying the derived modifications to the image data.

17. An apparatus for decimating image data comprised of a plurality of planes of pixel image data, each of the plurality of planes representing a different component of pixel image data for a plurality of pixels, the apparatus comprising:
   a memory for storing computer executable process steps; and
   a processor for executing the process steps stored in said memory;
   wherein said process steps include steps to determine busyness of a neighborhood for each pixel image data in one of the plurality of planes of image data, selectively apply a low-pass filter to each pixel image data in the plurality of planes of pixel image data based on the determination of busyness for each pixel image data in the one of the plurality of planes, and sub-sample the selectively filtered pixel image data in the plurality of planes.

18. An apparatus according to claim 17, wherein the image data is color image data comprised of multiple color planes, and wherein said step of determining busyness is conducted for only one color plane, and wherein said step of selectively applying a low-pass filter is executed for all pixels in all color planes based on the determination of busyness in one color plane.

19. An apparatus according to claim 17, further comprising the step of transforming the image data into a perceptual color space.

20. An apparatus according to claim 19, wherein said step of determining busyness determines busyness based on a brightness color plane, and wherein said step of selectively applying a low-pass filter is executed for pixels in all color planes. based on the determination of busyness in the brightness color plane.

21. An apparatus according to claim 17, wherein said step of selectively applying a low-pass filter further comprises the step of selecting low-pass filter characteristics based on a degree of busyness determined in said determining step.

22. An apparatus according to claim 17, wherein said step of determining busyness comprises the step of comparing intensity values for a target pixel with intensity values for adjacent pixels in the neighborhood.

23. An apparatus according to claim 17, wherein said step of determining busyness comprises the step of determining spatial frequency content in the neighborhood.

24. An apparatus according to claim 17, further comprising the steps of deriving modifications based on the decimated image and applying the derived modifications to the image data.

25. Computer-executable process steps stored on a computer readable medium, said process steps for decimating image data comprised of a plurality of planes of pixel image data, each of the plurality of planes representing a different component of pixel image data for a plurality of pixels, said process steps comprising:
   code to determine busyness of a neighborhood for each pixel image data in one of the plurality of planes of image data;
   code to selectively apply a low-pass filter to each pixel image data in the plurality of planes of pixel image data based on the determination of busyness for each pixel image data in the one of the plurality of planes; and
   code to sub-sample the selectively filtered pixel image data in the plurality of planes.

26. Computer-executable process steps according to claim 25, wherein the image data is color image data comprised of multiple color planes, and wherein said code to determine busyness is executed for only one color plane, and wherein code to selectively apply a low-pass filter is executed for all pixels in all color planes based on the determination of busyness in one color plane.

27. Computer-executable process steps according to claim 25, further comprising code to transform the image data into a perceptual color space.

28. Computer-executable process steps according to claim 27, wherein code to determine busyness is executed to determine busyness based on a brightness color plane, and wherein code to selectively apply a low-pass filter is executed for pixels in all color planes based on the determination of busyness in the brightness color plane.

29. Computer-executable process steps according to claim 25, wherein said code to selectively apply a low-pass filter further comprises code to select low-pass filter characteristics based on a degree of busyness determined by said determining code.

30. Computer-executable process steps according to claim 25, wherein said code to determine busyness comprises code to compare intensity values for a target pixel with intensity values for adjacent pixels in the neighborhood.

31. Computer-executable process steps according to claim 25, wherein said code to determine busyness comprises code to determine spatial frequency content in the neighborhood.

32. Computer-executable process steps according to claim 25, further comprising code to derive modifications based on the decimated image and code to apply the derived modifications to the image data.

33. A method for decimating pixel image data comprising the steps of:
   determining busyness corresponding to spatial frequency content of a neighborhood for each pixel in the image data;
   applying a low-pass filter exclusively to those pixels in the image data for which the busyness of the neighborhood is greater than a threshold busyness value; and
   sub-sampling the image data,
   wherein the image data is color image data comprised of multiple color planes, and wherein said determining step is conducted for only one color plane, and wherein said step of applying a low-pass filter is executed for all color planes based on the determination of busyness in one color plane.

34. A method according to claim 33, further comprising the step of transforming the image data into a perceptual color space.

35. A method according to claim 34, wherein said step of determining busyness determines busyness based on a brightness color plane, and wherein said step of applying a low-pass filter is executed for pixels in all color planes based on the determination of busyness in the brightness color plane.

36. A method according to claim 33, wherein said step of applying a low-pass filter further comprises the step of selecting low-pass filter characteristics based on a degree of busyness determined in said determining busyness step.

37. A method according to claim 33, wherein said step of determining busyness of a neighborhood comprises the step of comparing intensity values for a target pixel with intensity values for adjacent pixels in the neighborhood.

38. A method according to claim 33, wherein said step of determining busyness of a neighborhood comprises the step of determining spatial frequency content in the neighborhood.

39. A method according to claim 33, further comprising the steps of deriving modifications based on the decimated image and applying the derived modifications to the image data.

40. An apparatus for decimating pixel image data, comprising:
   determining means for determining busyness corresponding to spatial frequency content of a neighborhood for each pixel image data;
   applying means for applying a low-pass filter exclusively to those pixels in the image data for which the busyness of the neighborhood is greater than a threshold busyness value; and
   sub-sampling means for sub-sampling the image data,
   wherein the image data is color image data comprised of multiple color planes, and wherein said determining means operates on only one color plane, and wherein said applying means selectively applies a low-pass filter for all color planes based on the determination of busyness in one color plane.

41. An apparatus according to claim 40, further comprising the transforming means for transforming the image data into a perceptual color space.

42. An apparatus according to claim 41, wherein said determining means determines busyness based on a brightness color plane, and wherein said applying means selectively applies a low-pass filter for pixels in all color planes based on the determination of busyness in the brightness color plane.

43. An apparatus according to claim 40, wherein applying further comprises selecting means for selecting low-pass filter characteristics based on a degree of busyness determined by said determining means.

44. An apparatus according to claim 40, wherein said determining means comprises comparing means for comparing intensity values for a target pixel with intensity values for adjacent pixels in the neighborhood.

45. An apparatus according to claim 40, wherein said determining means comprises determining means for determining spatial frequency content in the neighborhood.

46. An apparatus according to claim 40, further comprising deriving means for deriving modifications based on the decimated image and applying the derived modifications to the image data.

47. An apparatus for decimating pixel image data, comprising:
   a memory for storing computer executable process steps; and
   a processor for executing the process steps stored in said memory;
   wherein said process steps include steps to determine busyness corresponding to spatial frequency content of a neighborhood for each pixel in the image data, apply a low-pass filter exclusively to those pixels in the image data for which the busyness of the neighborhood is greater than a threshold busyness value, and sub-sample the image data,
   wherein the image data is color image data comprised of multiple color planes, and wherein said determining step is conducted for only one color plane, and wherein said applying step is executed for all color planes based on the determination of busyness in one color plane.

48. An apparatus according to claim 47, further comprising the step of transforming the image data into a perceptual color space.

49. An apparatus according to claim 48, wherein said determining step determines busyness based on a brightness color plane, and wherein said applying step is executed for pixels in all color planes based on the determination of busyness in the brightness color plane.

50. An apparatus according to claim 47, wherein said step of applying a low-pass filter further comprises the step of selecting low-pass filter characteristics based on a degree of busyness determined in said determining step.

51. An apparatus according to claim 47, wherein said step of determining busyness comprises the step of comparing intensity values for a target pixel with intensity values for adjacent pixels in the neighborhood.

52. An apparatus according to claim 47, wherein said step of determining busyness comprises the step of determining spatial frequency content in the neighborhood.

53. An apparatus according to claim 47, further comprising the steps of deriving modifications based on the decimated image and applying the derived modifications to the image data.

54. Computer-executable process steps stored on a computer readable medium, said process steps for decimating pixel image data, the steps comprising:

code to determine busyness corresponding to spatial frequency content of a neighborhood for each pixel in the image data;

code to apply a low-pass filter exclusively to those pixels in the image data for which the busyness of the neighborhood is greater than a threshold busyness value; and code to sub-sample the image data, wherein the image data is color image data comprised of multiple color planes, and wherein said code to determine busyness is executed for only one color plane, and wherein said code to apply a low-pass filter is executed for all color planes based on the determination of busyness in the one color plane.

55. Computer-executable process steps according to claim 54, further comprising code to transform the image data into a perceptual color space.

56. Computer-executable process steps according to claim 54, wherein said code to determine busyness determines busyness based on a brightness color plane, and wherein said code to apply a low-pass filter is executed fo[00f8] pixels in all color planes based on the determination of busyness in the brightness color plane.

57. Computer-executable process steps according to claim 54, wherein said code to apply a low-pass filter further comprises code to select low-pass filter characteristics based on a degree of busyness determined by said determining code.

58. Computer-executable process steps according to claim 54, wherein said code to determine busyness comprises code to compare intensity values for a target pixel with intensity values for adjacent pixels in the neighborhood.

59. Computer-executable process steps according to claim 54, wherein said code to determine busyness comprises code to determine spatial frequency content in the neighborhood.

60. Computer-executable process steps according to claim 54, further comprising code to derive modifications based on the decimated image and code to apply the derived modifications to the image data.

\* \* \* \* \*

UNITED STATES PATENT AND TRADEMARK OFFICE
CERTIFICATE OF CORRECTION

PATENT NO.    : 6,453,074 B1
DATED         : September 17, 2002
INVENTOR(S)   : Joe Zheng It is certified that error appears in the above-identified patent and that said Letters Patent is hereby corrected as shown below:

Drawings,
Sheet 2, Fig. 2, "DECIMIATION" should read -- DECIMATION --.

Column 2,
Line 41, "adaptiv[0085]" should read -- adaptive --.

Column 3,
Line 27, "diagram" should read -- diagrams --.

Column 4,
Line 13, "(RAN)" should read -- (RAM) --.

Column 5,
Line 25, "low-pass:filtering" should read -- low-pass filtering --.

Column 6,
Line 45, "possible" should read -- possible to --.

Column 7,
Line 4, "With" should read -- with --.

Column 8,
Line 3, "SB03" should read -- S803 --;
Line 5, "that" should read -- that there is --; and
Line 62, "claim 1" should read -- claim 3 --.

Column 9,
Line 45, "applying" should read -- said applying means --.

Column 12,
Line 18, "applying" should read -- said applying means --.

UNITED STATES PATENT AND TRADEMARK OFFICE
CERTIFICATE OF CORRECTION

PATENT NO. : 6,453,074 B1
DATED : September 17, 2002
INVENTOR(S) : Joe Zheng

It is certified that error appears in the above-identified patent and that said Letters Patent is hereby corrected as shown below:

Column 14,
Line 2, "54," should read -- 55, --; and
Line 4, "fo[00f8]" should read -- for --.

Signed and Sealed this

Twenty-seventh Day of July, 2004

JON W. DUDAS
*Acting Director of the United States Patent and Trademark Office*